United States Patent [19]

Degawa et al.

[11] Patent Number: 4,695,427

[45] Date of Patent: Sep. 22, 1987

[54] METHOD FOR PRODUCTION OF LANTHANIDE-CONTAINING ALLOY

[75] Inventors: Toru Degawa, Kurashiki; Kozo Fujiwara, Tamano; Akio Hashimoto, Takamatsu; Seiju Uchida, Tamano; Gen Okuyama, Tamano; Susumu Matsui, Tamano, all of Japan

[73] Assignee: Mitsui Engineering & Shipbuilding Co., Ltd., Tokyo, Japan

[21] Appl. No.: 927,790

[22] Filed: Nov. 5, 1986

[30] Foreign Application Priority Data

Nov. 19, 1985 [JP] Japan .................................. 60-259385
Jun. 5, 1986 [JP] Japan .................................. 61-130996

[51] Int. Cl.$^4$ .......................... C22B 34/00; C21B 7/04
[52] U.S. Cl. ........................................ 420/129; 75/84; 266/280
[58] Field of Search ............................ 420/129; 75/84; 266/280

[56] References Cited

U.S. PATENT DOCUMENTS 3,328,017  6/1967  Conner ................................ 266/280

Primary Examiner—Peter D. Rosenberg
Attorney, Agent, or Firm—Frank J. Jordan; C. Bruce Hamburg; Manabu Kanesaka

[57] ABSTRACT

A lanthanide-containing alloy is produced by retaining the melt of this alloy by the use of a container having the inner surface formed of a calcia-based refractory possessing a CaO content of not less than 90% by weight in a non-oxidizing atmosphere.

19 Claims, No Drawings

METHOD FOR PRODUCTION OF LANTHANIDE-CONTAINING ALLOY

FIELD OF THE INVENTION AND RELATED ART STATEMENT

This invention relates to a method for the production of a lanthanide-containing alloy and more particularly to a method for the production of a highly clean lanthanide-containing alloy useful as a target alloy for a magneto-optical (M-O) disc.

Regarding the 15 rare earth elements ranging from lanthanum of Atomic Number 57 through lutetium of Atomic Number 71, namely La, Ce, Pr, Nd, Pm, Sm, Eu, Gd, Tb, Dy, Ho, Er, Tm, Yb, and Lu, which are collectively called as "lanthanides," studies on the incorporation of these elements in alloy systems for utilization of specific qualities of the individual elements are being continued in a wide variety of fields, and alloys using these elements have been finding utility in applications to various industrial fields.

For instance, $LaNi_5$, $SmCo_5$, and misch metal (Mm)-Ni type alloys such as, for example, $MmNi_{4.5}Al_{0.5}$, $MmNi_{4.5}Mn_{0.5}$, and $MmNi_{4.7}Al_{0.3}Zr_{0.1}$ are capable of easily occluding large volumes of hydrogen and, therefore, are utilized as hydrogen-absorbing alloys.

Further, $SmCO_5$(Sm 36%), $Sm_2Co_{17}$, Ce-Co (Ce 20%), $(Sm_{1-x}Pr_x) Co_5$, Nd-Fe (Nd 20 to 25%), $Sm_2(FeCuZrCo)_{17}$(Sm 25% and Co 50%), and $Nd_{8\sim30}B_{2\sim28}$ Fe balance of 100 (such as, for example, $Nd_{15}B_8Fe_{77}$) exhibit extremely strong magnetic properties owing to the magnetic characteristics inherent in lanthanides and, therefore, are extensively utilized as permanent magnets in small motors. An amorphous alloy of the composition of $(Fe_{0.82}B_{0.18})_{0.9}$- $Tb_{0.05}La_{0.05}$ has also been developed as a magnet.

Moreover, as concerns magnetic recording materials, since Fe-based, Co-based, and Ni-based amorphous alloys containing Gd, Tb, and Dy such as GdCo, GdFe, DyFe, GdTeFe, TbFeCo, TbDyFe, GdTbFe, and GdTeCo form magnetic films excellent in the square-shape property in hysteresis loop, exhibit outstanding magnetizing property and erasing property, permit high-density recording, and undergo deterioration through aging only minimally, the efforts currently continued on the research and development of these alloys are attracting much interest and arousing great expectations.

Besides, Yb-Al, Yb-Zr-Al and Mm-Zr-Al have found utility as large-capacity Al cables of improved thermal stability, TiGd (Gd 5%) as a strong light alloy, MgNd as a creep-resistant Mg alloy, and NiCrLa and FeCrLa as heat-resistant alloys capable of resisting oxidation at elevated temperatures.

Recently, as the most important use for lanthanide-containing alloys, studies on utilization of the alloys in applications to M-O discs are being pursued and trials and studies in actual use are now under way.

To date, amorphous magnetic films of the combinations of rare earth metals (RE) such as Gd, Tb and Dy with transition metals (TM) such as Fe, Co and Ni which are enumerated below have been developed as M-O disc memory media.

Gd-Tb-Fe, Gd-Tb-Co, Tb-Fe-Co, Tb-Dy-Fe, Gd-Tb-Fe-Ge, Gd-Co, Tb-Fe, Gd-Fe, Fe-Co-Tb-Gd, Tb-Dy-Fe-Co, Dy-Fe, and Gd-Fe-Bi.

Of the alloys described above, the Co-Ge, Gd-Fe and Tb-Fe type alloys were the first to attract attention as promising M-O recording materials. Since then, the attention is switching to the Tb-Fe-Co and Gd-Tb-Co type alloys owing to their merits in compositional sensitivity and recording density.

These RE-TM magnetic films possess the following characteristics as M-O memory media and, therefore, are hopefully expected to find practical utility.

(1) The alloys have high sensitivity to recording and erasing because they have relatively low Curie points and are also capable of compensation recording. They permit recording and erasure by means of a semiconductor laser (LD).

(2) The alloys have low medium noise because they have amorphous textures. Their Kerr rotation angles are relative large, ranging from 0.2° to 0.35°. Thus, the SN ratios of their regenerated signals are large.

(3) Since the alloys form perpendicularly magnetizing films, they permit high-density recording and also permit efficient use of the pole-Kerr effect and the Faraday effect of high M-O performance.

(4) The alloys are capable of forming films of large surface areas on substrates of varying types.

(5) The alloys permit their mixing ratios of component metals to be varied continuously and can be admixed freely with various elements relatively.

These lanthanide-containing alloys have been heretofore produced by being melted and cast in alumina-based crucibles, for example.

While, lanthanides are highly reactive and readily react with oxygen (O), sulfur (S), and nitrogen (N). In the conventional melting of these alloys in the aforementioned crucibles, the inclusion of oxygen and sulfur into the melts has been an unavoidable phenomenon. Further, the high activity inherent in lanthanides induces problems such as contamination of alloys with refractory material exposed to the melts and formation of lanthanide oxides, decrease of lathanide contents in produced alloys, and breakage of refractory material in an extreme case.

For example, the melt is contaminated with an alumina-based refractory material through the reaction of the following formula, in which Ln stands for a lanthanide element.

$$Al_2O_3 + 2Ln \rightarrow 2Al + Ln_2O_3$$

or $$Al_2O_3 + 3Ln \rightarrow 2Al + 3LnO$$

As denoted in the above, when the lanthanide-containing alloy is melted in the conventional refractory container, the produced alloy does not acquire sufficiently high purity.

By the method of arc melting, plasma melting, or atomic beam melting which utilizes a high-heat source in a water-cooled copper crucible, it is extremely difficult to obtain the alloy of homogeneous texture because the heating is effected locally.

Generally, photomagnetic discs are required to exhibit a high performance in terms of sensitivity of recording regeneration, and erasure, recording density, anisotropy of perpendicular magnetization, Kerr rotation angle, and service life. These properties are profoundly affected by the purity and homogeneity of the target alloy for M-O disc.

By the conventional methods however, the lanthanide-containing alloys cannot be produced with high purity and in high homogeneity as described above. Particularly in the case of those alloys containing such RE component as Tb, Gd or Dy in a concentration falling approximately in the range of 10 to 50% by weight and intended for use as a target alloy for M-O disc, since the melts are highly susceptible of contamination due to inclusion of oxygen and the alloys consequently produced are highly susceptible of fructure, the method adopted for their production has many problems to be solved.

Summary of the Invention

An object of this invention is to provide a method for the production of a lanthanide-containing alloy, which permits easy production of a lanthanide-containing alloy of high purity, having low oxygen and sulfur contents and enjoying freedom from contamination with the refractory material.

Another object of this invention is to provide a method for the production of a lanthanide-containing alloy, which permits production of a lanthanide-containing alloy of extremely fine quality, excelling in magnetic properties, corrosionproofness, and thermal stability and exhibiting high mechanical strength.

Yet another object of this invention is to provide a method for highly stable and efficient production of a lanthanide-containing alloy.

A further object of this invention is to provide a method for the production of a lanthanide-containing alloy, permitting the lanthanide-containing alloy to be re-melted and re-cast easily and ensuring efficient reclamation of the alloy from scraps thereof.

To be specific, this invention concerns a method for the production of a lanthanide-containing alloy, which method is characterized by retaining the melt of said alloy by the use of a container having the inner surface thereof formed of a calcia-type refractory possessing a CaO content of not less than 90% by weight in a non-oxidizing atmosphere.

DESCRIPTION OF THE PREFERRED EMBODIMENTS

Now, the present invention will be described more specifically below.

Wherever % is mentioned in this specification, it invariably means "% by weight."

The expression "lanthanide-containing alloy" as used in this invention means an alloy containing at least one lanthanide element selected from the group consisting of La, Ce, Pr, Nd, Pm, Sm, Eu, Gd, Td, Dy, Ho, Er, Tm, Yb, and Lu. Examples of the lanthanide-containing alloy include alloys of 3 to 80%, particularly not less than 10%, and preferably 10 to 50%, of such lanthanides with at least one member selected from the group consisting of Al, Cr, Fe, Mn, Ni, Cu, V, Li, Co, Ti, Ta, W, Sn, Zr, Mo, Mg, Ga, Nb, Si, and Bi.

Concrete examples of the lanthanide-containing alloys known to the art are enumerated below.

5%Gd-Ti, Nd-Mg, 20~25%Nd-Fe, $Nd_{8\sim30}-B_{2\sim28}-Fe$, $SmCo_5$, $Sm_2Co_{17}$, $Sm_2(FeCuZrCo)_{17}$, $(Sm_{1-x}-Pr_x)Co_5$, $LaNi_5$, $MmNi_5$, Ge-Fe, Ge-Te-Fe, Gd-Te-Co, Gd-Co, 20%Ce-Co, Dy-Fe, Y-Zn-Al, Mm-Zr-Al, Y-Al, La-Ni-Cr, La-Fe-Cr, $(Fe_{0.82}B_{0.18})_{0.9}Tb_{0.05}La_{0.05}$, Tb-Fe-Co, Tb-Dy-Fe, Sc-Mg-Al, Sc-Li-Al, $Sc_5Ga_3$, 20~30% Mm-Mg, Mm-Co, $MmNi_{4.5}Al_{0.5}$, $MmNi_{4.5}Mn_{0.5}$, and $MmNi_{4.5}Al_{0.3}Zr_{0.1}$.

Particularly, the method of this invention is effective in producing target alloys containing not less than 10%, preferably 10 to 50%, of lanthanide elements for use in photomagnetic discs. Concrete examples of the alloys answering the description given above are shown below.

GdCo, GdFe, TbFe, $Gd_{13}Tb_{13}Fe_{74}$, TbDyFe, GdTbDyFe, $Gd_{26}(Fe_{81}Co_{19})_{74}$, $[(GdTb)_{27}Fe_{73}]_{96}Ge_4$, $Tb_{21}(Fe_{85}Co_{15})_{79}$, $(GdTb)_{23}Co_{77}$, $(Gd_{50}Tb_{50})_{1-a}(Fe_{85}Co_{15})_a$, $(Gd_{20}Co_{80})_{50}(Tb_{21}Te_{79})_{50}$, $(Gd_{33}Tb_{67})_{37}(Fe_{53}Co_{47})_{63}$-Sm, $(Gd_{26}Fe_{74})_{96}Bi_7$, $(Gd_{26}Co_{74})_{93}Bi_4$, and $(Gd_{26}(Fe_{70}Co_{30})_{74})_{91}Bi_9$.

In the present invention, such a lanthanide-containing alloy as shown above is produced by heating the alloy by the conventional method such as, for example, a high-frequency or low-frequency induction heating by the use of a container having the inner surface thereof formed of a calcia-based refractory possessing a CaO content of not less than 90% in a non-oxidizing atmosphere.

The materials of the CaO-based refractory of which the inner surface of the container used for the production of the lanthanide-containing alloy in the present invention are of calcia (CaO), dolomite obtained by enriching CaO, and $ZrO_2$ and $Y_2O_3$ as coexisting oxides. Lanthanide type oxides are also available. Because of high density of texture, electrically fused clacia proves particularly desirable among other CaO products of varying grades. Calcia (CaO) products obtained by firing quick lime, limestone, and slaked lime are also desirable.

The occurrence of impurity and the contamination of the melt are prevented with the degree of certainty which increases with the increasing CaO content in the CaO-based refractory. In the present invention, it is desirable to use the container which is formed of a CaO-based refractory possessing a CaO content of not less than 90%, particularly not less than 95%, and preferably not less than 98%.

In the CaO-based refractory, the contents of $CaF_2$ and $CaCl_2$ are desired to be as low as permissible. The content of $CaF_2$ is desired to be not more than 1% and that of $CaCl_2$ to be not more than 0.5%.

When the lanthanide-containing alloy is produced in the container formed of the CaO-based refractory as described above, the atmosphere in which the production is effected is desired to be an atmosphere of such inert gas as argon or helium. The pressure of the atmosphere is desired to be not less than 10 torrs, preferably to keep in the range of 25 to 100 torrs.

The temperature for the production is desired to be 50° to 200° C., preferably 100° to 150° C., higher than the melting point of the alloy under treatment. If the retention time is too long, there ensues the possibility of the melt being contaminated. To avoid this contamination, therefore, the retention time is desired to keep approximately in the range of 5 to 10 minutes, preferably 5 to 6 minutes.

The melt of the lanthanide-containing alloy obtained by the method of this invention is then poured into a die of a desired shape and converted into an ingot. For solidification by cooling, the hot ingot is desired to be gradually cooled in a preheated iron die at a rate of not more than 1° C./minute, preferably 0.5° to 1° C./minute.

In accordance with the method of this invention constructed as described above, the produced metal has a notably lowered content of entrained oxygen and it can be re-melted by suitably controlling and adjusting the conditions of production.

CaO has extremely high stability to resist the melt of an alloy containing a highly active metal and it is stable even in the melt of a lanthanide-containing alloy. Unlike Al$_2$O$_3$ which reacts with a lanthanide and forms a corresponding lanthanide oxide, CaO only springly forms an oxide with a lanthanide. CaO, therefore, is incapable of decreasing the lanthanide content of the melt of the lanthanide-containing alloy or contaminating the melt with impurities. Particularly, in accordance with the method of this invention, the oxygen content in the lanthanide containing alloy is notably lowered. Even in the case of a Gd- or Tb-based alloy having an oxygen content on the level of 2,000 to 3,000 ppm, for example, the alloy produced or the alloy remelted by the method of the present invention possesses an oxygen content lowered to the range of 150 to 500 ppm.

This notable decrease of the oxygen content in the produced alloy may be logically explained by a supposition that the oxygen in the melt undergoes a reaction of the following formula:

$$xR + yO \rightarrow R_xO_y$$

(wherein R stands for a lanthanide element) and that since the refractory containing not less than 90% of CaO readily undergoes the so-called furnace wall reaction with the oxide in the melt, the lanthanide oxides such as GdO$_2$ and TbO$_2$ in the melt react with the furnace wall as indicated by the following formula and consequently are absorbed in the crucible wall:

$$nR_xO_y + mCaO \text{ (crucible wall)} \rightarrow n.R_xO_y.mCaO$$
(reaction on crucible wall)

(wherein R stands for a lanthanide element).

Similarly to the oxide, the sulfur in the melt of the lanthanide-containing alloy first undergoes the following conversion:

$$xR + yS \rightarrow R_xS_y$$

This sulfide then undergoes the crucible wall reaction as represented by the following formula:

$$nR_xS_y + mCaO \text{ (crucible wall)} \rightarrow nR_xS_y.mCaO$$
or
$$R_xS_y + yCaO \rightarrow R_xO_y + yCaS \text{ (crucible wall)}$$

In either of the reactions shown above, the sulfide is eventually absorbed by the crucible wall. Consequently, the oxide and sulfide contents are notably decreased, rendering it possible to produce a lanthanide-containing alloy of high purity.

In accordance with the method of this invention which retains the melt of the lanthanide-containing alloy in the container having the inner surface thereof formed of the CaO-based refractory of the aforementioned composition in the nonoxidizing atmosphere, therefore, there are manifested various effects as follows:

(1) The lanthanide-containing alloy of low oxygen and sulfur contants, free from contamination with the refractory can be easily obtained. Particularly the oxygen content of the alloy is notably low.

(2) The produced alloy, therefore, exhibits highly satisfactory performance in terms of magnetic properties, corrosionproofness, and thermal stability. The alloy also enjoys highly improved mechanical strength.

(3) The refractory cannot be corroded and damaged by the lanthanide of the alloy and, therefore, enables the production of the alloy to be continued for a long time.

(4) The alloy produced acquires a highly homogeneous composition.

(5) The method enables the lanthanide-containing alloy to be re-melted and re-cast easily and, therefore, ensures efficient reclamation of the alloy from scraps thereof.

The method of this invention, thus, permits a lanthanide-containing alloy of high purity to be produced easily and proves highly advantageous from the economic point of view.

Particularly, the method of this invention is effective in producing a target disc containing not less than 10% of Gd, Tb or Dy for use in a M-O disc. The alloy obtained by this invention eliminates the problem of cracking and permits provision of M-O discs of high performance.

Further, the present invention can be adopted satisfactorily for the melting of lanthanide-containing alloy scraps.

Now, the present invention will be described more specifically below with reference to working examples. This invention is not limited to the following examples but may be practised otherwise without departure from the spirit of the invention.

EXAMPLE 1

A varying lanthanide-containing alloy indicated in Table 1 was placed in a CaO-based crucible or Al$_2$O$_3$-based crucible of a varying composition shown in Table 2, then set in an internally heating type induction furnace having an output of 10 kw and a frequency of 50 KHz, melted in an atmosphere of 2 torrs of argon, kept at a temperature 200° C. higher than the melting point of the relevant alloy for 10 minutes. The alloy consequently produced was assayed for O and S contents by chemical analysis and fluorescent X-ray. The results are shown in Table 1.

It is clearly noted from Table 1 that the production using the CaO crucible gave lanthanide-containing alloys of high purity, having low O and S contents.

In the comparative experiment, in which the melting was carried out in the Al$_2$O$_3$ crucible, the produced alloys were found to be contaminated with aluminum and to be retaining 0.1 to 0.05% of Al.

TABLE 1

| | | O and S contents in alloy (ppm) | | | |
| | Lanthanide-containing | Alloys from CaO crucible | | Alloys from Al$_2$O$_3$ crucible | |
| No. | alloy | O | S | O | S |
|---|---|---|---|---|---|
| 1 | 32% La—Ni | 90 | 4 | 137 | 8 |
| 2 | 22% Nd—Fe | 650 | 5 | 1400 | 10 |
| 3 | 36% Sm—Co | 950 | 4 | 1830 | 8 |
| 4 | 50% Gd—Fe | 840 | 6 | 1800 | 10 |
| 5 | 20% Tb—Co | 630 | 8 | 2100 | 12 |

TABLE 2

| Composition (%) | CaO-based crucible | Al$_2$O$_3$-based crucible |
|---|---|---|
| Al$_2$O$_3$ | 0.01 | Balance |
| MgO | 0.34 | <0.01 |
| CaO | Balance | <0.01 |
| SiO$_2$ | 0.03 | 0.78 |
| Fe$_2$O$_3$ | 0.01 | 0.10 |

TABLE 2-continued

| Composition (%) | CaO-based crucible | Al$_2$O$_3$-based crucible |
|---|---|---|
| B$_2$O$_3$ | <0.01 | 0.04 |
| ZrO$_2$ | — | — |

EXAMPLE 2

In a varying crucible indicated in Table 4, a 30%Fe-30%Co-20%Gd-20%Tb alloy was produced by following the procedure of Example 1, excepting an atmosphere of 25 torrs of argon was used instead and the temperature of melting was changed to 50° C. higher than the melting point of a relevant alloy.

The alloy consequently obtained was assayed for O and S contents by chemical analysis and fluorescent X-ray analysis. The results are shown in Table 3.

It is clearly noted from Table 3 that the production in the CaO crucible having a particularly high CaO content and low CaF$_2$ and CaCl$_2$ contents gave lanthanide-containing alloys of high purity having low O and S contents.

TABLE 3

| | | CaO-based crucible | |
|---|---|---|---|
| Crucible used | | I | II |
| Content in cruciple (ppm) | O | 186 | 238 |
| | S | 10 | 13 |

TABLE 4

| | CaO-based crucible | |
|---|---|---|
| Composition (%) | I | II |
| CaO | Balance | Balance |
| Al$_2$O$_3$ | 0.01 | 0.05 |
| MgO | 0.34 | 0.34 |
| SiO$_2$ | 0.03 | 0.03 |
| Fe$_2$O$_3$ | 0.01 | 0.01 |
| B$_2$O$_3$ | <0.01 | <0.01 |
| ZrO$_2$ | — | — |
| CaF$_2$ | <1 | <1 |
| CaCl$_2$ | 0.5 | <1 |

EXAMPLE 3

A 40%Gd-60%Fe alloy (melting point 1,220° C.) was re-melted in a CaO-based crucible of the composition shown in Table 2, with the crucible placed in an internally heating type induction furnace having an output of 10 kw and a frequency of 50 kHz, heated in an atmosphere of 250 torrs of argon at a varying temperature shown in Table 5, and retained at the temperature for a varying length of time indicated in Table 5.

The alloy consequently obtained was assayed for O and S contents by chemical analysis and fluorescent X-ray analysis.

The results are shown in Table 5.

TABLE 5

| No. | Temperature (°C.) | Retention time (minute) | Contents in alloy (ppm) | |
|---|---|---|---|---|
| | | | O | S |
| 6 | 1270 | 5 | 63 | 8 |
| 7 | 1420 | 5 | 86 | 12 |
| 8 | 1270 | 10 | 98 | 20 |
| 9 | 1420 | 10 | 110 | 35 |
| 10 | 1270 | 20 | 137 | 22 |
| 11 | 1270 | 30 | 238 | 28 |
| 12 | 1270 | 60 | 382 | 32 |

EXAMPLE 4

A 40%Tb-30%Fe-30%Co alloy was produced in a CaO-based crucible of a varying composition indicated in Table 2, with the crucible set in an internally heating type induction furnace having an output of 10 kw and a frequency of 50 kHz, heated in an atmosphere of 25 torrs of argon at a temperature 100° C. higher than the melting point of the relevant alloy, and retained at the temperature for a varying length of time from 5 to 10 minutes.

The melt consequently obtained was poured in a preheated die and gradually cooled at a varying rate shown in Table 6 to afford an ingot.

The ingot thus obtained was assayed for O and S contents by chemical analysis and flurescent X-ray analysis.

The results are shown in Table 6.

It is clearly noted from Table 6 that when the cooling was effected gradually at a rate of not more than 1° C./minute, there were obtained lanthanide-containing alloys of high purity.

TABLE 6

| No. | Rate of cooling | Contents in alloy (ppm) | |
|---|---|---|---|
| | | O | S |
| 13 | 1 | 192 | 15 |
| 14 | 1 | 218 | 15 |
| 15 | 3 | 230 | 25 |
| 16 | 3 | 242 | 28 |
| 17 | 5 | 250 | 32 |
| 18 | 10 | 500 | 70 |

EXAMPLE 5

A varying lanthanide-containing alloy indicated in Table 7 was placed in a CaO crucible or Al$_2$O$_3$ crucible of a varying composition indicated in Table 2 and treated by following the procedure of Example 1. The alloy consequently obtained was assayed for O and S contents by chemical analysis and fluorescent X-ray analysis. The results are shown in Table 7.

It is clearly noted from Table 7 that when the production was made in the CaO crucible, the lanthanide-containing alloys produced had low O and S contents and possessed high purity.

In the comparative experiment using the Al$_2$O$_3$ crucible, the produced alloys were found to be contaminated with aluminum and to be retaining 0.1 to 0.5% of aluminum therein.

TABLE 7

| | | O and S contents in alloy (ppm) | | | |
|---|---|---|---|---|---|
| | Lanthanide-containing | Alloy from CaO-based crucible | | Alloy from Al$_2$O$_3$-based crucible | |
| No. | alloy (%) | O | S | O | S |
| 19 | Fe—30Gd | 310 | 4 | 1200 | 8 |
| 20 | Fe—15Co—20Tb—20Gd | 220 | 5 | 1150 | 12 |
| 21 | Fe—20Tb—20Co | 150 | 4 | 1030 | 10 |
| 22 | Co—50Tb | 295 | 3 | 1210 | 18 |
| 23 | Fe—50Tb | 315 | 6 | 1340 | 12 |
| 24 | Co—15Tb—25Dy | 195 | 5 | 1050 | 16 |

TABLE 7-continued

| | Lanthanide-containing | O and S contents in alloy (ppm) | | | |
| | | Alloy from CaO-based crucible | | Alloy from Al$_2$O$_3$-based crucible | |
| No. | alloy (%) | O | S | O | S |
|---|---|---|---|---|---|
| 25 | Fe—15Tb—28Dy | 210 | 3 | 1230 | 18 |
| 26 | Fe—20Co—40Tb | 185 | 4 | 1080 | 14 |

What is claimed is:

1. A method for the production of a lanthanide-containing alloy, comprising melting under non-oxidizing atmosphere the lanthanide-containing alloy by the use of a container having the inner surface thereof formed of a calcia-based refractory possessing a CaO content of not less than 90% by weight.

2. A method according to claim 1, wherein said lanthanide-containing alloy contains not less than 10% by weight of the lanthanide.

3. A method according to claim 2, wherein said lanthanide-containing alloy is a target alloy containing not less than 10% by weight of the lanthanide and used for a photomagnetic disc.

4. A method according to claim 1, wherein said lanthanide-containing alloy comprises 10 to 50% by weight of at least one lanthanide element and the balance of at least one member selected from the group consisting of Al, Cr, Fe, Mn, Ni, Cu, V, Li, Co, Ti, Ta, W, Sn, Zr, Mo, Mg, Ga, Nb, Si, and Bi.

5. A method according to claim 1, wherein said calcia-based refractory comprises not less than 90% by weight of CaO, not more than 1% by weight of CaF$_2$, and not more than 0.5% by weight of CaCl$_2$.

6. A method according to claim 5, wherein said calcia-based refractory comprises not less than 95% by weight of CaO, not more than 1% by weight of CaF$_2$, and not more than 0.5% by weight of CaCl$_2$.

7. A method according to claim 1, wherein said refractory is made of electrically fused calcia.

8. A method according to claim 1, wherein said non-oxidizing atmosphere is an atmosphere of an inert gas.

9. A method according to claim 8, wherein said non-oxidizing atmosphere is an atmosphere of argon gas.

10. A method according to claim 9, wherein said non-oxidizing atmosphere is an atmosphere of not less than 10 torrs of argon gas.

11. A method according to claim 1, wherein said melt of the lanthanide-containing alloy is retained at a temperature 50° to 200° C. higher than the melting point of said alloy.

12. A method according to claim 1, wherein said melt of the lanthanide-containing alloy is retained for 3 to 10 minutes.

13. A method according to claim 1, wherein the alloy contains not less than 10% by weight of a lanthanide and is produced by retaining the melt of said lanthanide-containing alloy by the use of a container having the inner surface thereof formed of a calcia-based refractory comprising not less than 90% by weight of CaO, not more than 1% by weight of CaF$_2$, and not more than 0.5% by weight of CaCl$_2$ in an atmosphere of an inert gas at a temperature 50° to 200° C. higher than the melting point of said alloy.

14. A method according to claim 13, wherein the alloy containing not less than 10% by weight of a lanthanide is used for a photomagnetic disc and is produced by retaining the melt of said alloy by the use of a container having the inner surface thereof formed of a calcia-based refractory comprising not less than 95% by weight of CaO, not more than 1% by weight of CaF$_2$, and not more than 0.5% by weight of CaCl$_2$ in an atmosphere of argon gas under a pressure of not less than 25 torrs at a temperature 50° to 200° C. higher than the melting point of said alloy for 3 to 10 minutes 15. A method for producing a lanthanide-containing alloy, comprising melting under non-oxidizing atmosphere the lanthanide-containing alloy in a container having an inner surface formed of a calcia-based refractory including a CaO content of not less than 90% by weight, whereby oxygen and sulfur contained in the molten alloy react with CaO in the refractory so that the oxygen and sulfur are substantially absorbed in the refractory and thereby removed from the molten alloy to provide high purity alloy.

16. A method according to claim 15, wherein said calcia-based refractory comprises not less than 95% by weight of CaO, not more than 1% by weight of CaF$_2$, and not more than 0.5% by weight of CaCl$_2$.

17. A method according to claim 16, wherein the lanthanide-containing alloy is retained in the container at a temperature 50 to 200 degrees centigrade higher than melting point of the alloy and for 3 to 10 minutes to avoid contamination of the alloy.

18. A method according to claim 17, wherein oxygen and sulfur in the alloy are removed at least up to 950 ppm and 70 ppm, respectively.

19. A method according to claim 18, wherein the alloy melted in the calcia-based refractory is gradually cooled at a rate not more than one degree centigrade per one minute.

* * * * *